(12) United States Patent
Yamauchi et al.

(10) Patent No.: US 9,791,216 B2
(45) Date of Patent: Oct. 17, 2017

(54) HEAT RECOVERY-TYPE HEATING DEVICE (75) Inventors: Takafumi Yamauchi, Seto (JP);
Takashi Shimazu, Nagoya (JP);
Tsutomu Shinagawa, Nagoya (JP);
Shuzou Sanda, Nagoya (JP)

(73) Assignee: KABUSHIKI KAISHA TOYOTA CHUO KENKYUSHO, Aichi-Gun (JP)

( * ) Notice: Subject to any disclaimer, the term of this patent is extended or adjusted under 35 U.S.C. 154(b) by 686 days.

(21) Appl. No.: 14/346,559

(22) PCT Filed: Aug. 31, 2012

(86) PCT No.: PCT/JP2012/072172
§ 371 (c)(1),
(2), (4) Date: Mar. 21, 2014

(87) PCT Pub. No.: WO2013/047084
PCT Pub. Date: Apr. 4, 2013

(65) Prior Publication Data
US 2014/0224453 A1 Aug. 14, 2014

(30) Foreign Application Priority Data
Sep. 26, 2011 (JP) ................................. 2011-209492

(51) Int. Cl.
*F28D 15/00* (2006.01)
*F28D 20/00* (2006.01)
(Continued)

(52) U.S. Cl.
CPC ....... *F28D 20/003* (2013.01); *B60H 1/00271* (2013.01); *B60H 1/00278* (2013.01);
(Continued)

(58) Field of Classification Search
CPC . F28D 20/003; H01M 10/659; H01M 10/625; H01M 10/615; H01M 10/6595;
(Continued)

(56) References Cited

U.S. PATENT DOCUMENTS 3,772,879 A * 11/1973 Engdahl .................. F01K 25/00
60/671
6,634,183 B1 * 10/2003 Jonsson .................. C09K 5/063
62/324.1
(Continued)

FOREIGN PATENT DOCUMENTS

DK   EP 2361883 A1 *  8/2011  ............. C01C 1/006
EP   1 550 830 A1    7/2005
(Continued)

OTHER PUBLICATIONS

Nov. 27, 2012 International Search Report issued in International Application No. PCT/JP2012/072172 (with translation).
(Continued)

*Primary Examiner* — Claire Rojohn, III
(74) *Attorney, Agent, or Firm* — Oliff PLC (57) ABSTRACT

An object is to enable a compact and high output heat storage system to perform warm-up rapidly when a vehicle is started up, and after warm-up, to recover surplus heat that is present in a heat source in the vehicle to prepare for the next warm-up event. A heat recovery-type heating device includes: an ammonia buffer configured so as to be capable of fixing and desorbing ammonia that serves as a chemical reaction medium; and a chemical heat storage reactor provided with a chemical heat storage material that generates heat through a chemical reaction with ammonia supplied from the ammonia buffer, and that desorbs ammonia using surplus heat from a heat source and returns the ammonia to the ammonia buffer.

14 Claims, 9 Drawing Sheets (51) Int. Cl.
*B60H 1/00* (2006.01)
*H01M 10/625* (2014.01)
*H01M 10/615* (2014.01)
*H01M 10/6595* (2014.01)
*H01M 10/659* (2014.01)
*F01P 11/20* (2006.01)

(52) U.S. Cl.
CPC ....... *H01M 10/615* (2015.04); *H01M 10/625* (2015.04); *H01M 10/659* (2015.04); *H01M 10/6595* (2015.04); *F01N 2610/02* (2013.01); *F01P 2011/205* (2013.01); *Y02E 60/142* (2013.01)

(58) Field of Classification Search
CPC ............. B60H 1/00278; F01N 2610/02; F01P 2011/205; Y02E 60/142
USPC .......................... 165/104.21, 41, 42, 51, 52
See application file for complete search history.

(56) References Cited

U.S. PATENT DOCUMENTS

| | | | | |
|---|---|---|---|---|
| 2001/0053342 | A1* | 12/2001 | Marko | B01D 53/8625 423/235 |
| 2006/0080960 | A1* | 4/2006 | Rajendran | F01K 25/065 60/649 |
| 2007/0207351 | A1* | 9/2007 | Christensen | C01C 1/006 429/421 |
| 2009/0071155 | A1* | 3/2009 | Boyapati | F01K 7/36 60/649 |
| 2010/0021780 | A1* | 1/2010 | Johannessen | B01D 53/8631 429/421 |
| 2010/0047638 | A1* | 2/2010 | Johannessen | B01D 53/9431 429/421 |
| 2010/0139257 | A1* | 6/2010 | Driscoll | B01D 53/9409 60/297 |
| 2010/0293927 | A1* | 11/2010 | Johannessen | B01D 53/79 60/295 |
| 2011/0036537 | A1* | 2/2011 | Seki | C09K 5/063 165/10 |
| 2013/0209316 | A1* | 8/2013 | Johannessen | C01C 1/006 422/109 |
| 2015/0192049 | A1* | 7/2015 | Suzuki | F01N 5/02 60/300 |

FOREIGN PATENT DOCUMENTS

| | | | | |
|---|---|---|---|---|
| JP | A-06-508425 | 9/1994 | | |
| JP | A-2004-150791 | 5/2004 | | |
| JP | WO 2004038304 A1 * | 5/2004 | ............... | F24H 4/02 |
| JP | A-2007-032592 | 2/2007 | | |
| JP | A-2009-144623 | 7/2009 | | |
| JP | A-2009-233647 | 10/2009 | | |
| JP | A-2009-287828 | 12/2009 | | |
| JP | A-2010-223575 | 10/2010 | | |
| JP | A-2010-230268 | 10/2010 | | |
| JP | A-2011-106355 | 6/2011 | | |

OTHER PUBLICATIONS

Feb. 12, 2014 Office Action issued in Japanese Application No. 2011-209492 (with translation).

* cited by examiner

FIG.9

HEAT RECOVERY-TYPE HEATING DEVICE

TECHNICAL FIELD

The present invention relates to a heat recovery-type heating device.

BACKGROUND ART

Engine lubrication devices have been disclosed that supply oil inside an oil tank to various portions of an engine with a main pump, and that supply oil inside a heat storage tank to the periphery of a crankshaft with a sub pump (see Patent Document 1).

In such devices, the sub pump jets the high temperature oil stored in the heat storage tank from a jetting tube mainly towards the journal for the crankshaft when the engine is started up. The periphery of the crankshaft is accordingly warmed up, and friction is reduced.

After warm-up of the engine has been completed, the high temperature oil is stored in the oil tank. The high temperature oil in the heat storage tank is used up when the engine is started up, such that in order to prepare for the next warm-up event, high temperature oil inside the oil tank is fed to the heat storage tank by the sub pump and stored once again in the heat storage tank.

In such devices, high temperature oil from the sub pump system can moreover be supplied to the main pump system.

Patent Document 1: Japanese Patent Application Laid-Open (JP-A) No. 2009-144623

SUMMARY OF INVENTION

Technical Problem

However, in the conventional example described above, in practice the heat capacity at the periphery of the crankshaft in an engine is very large, for example 4 kJ/K at a shaft portion, 27 kJ/K at an engine block, and 0.26 kJ/K for a connecting rod. Attempting to raise the temperature of these respective components by 50K requires large amounts of heat, namely 4×50=200 kJ for the shaft portion, 27×50=1350 kJ for the engine block, and 0.26×50=13 kJ for the connecting rod, to give a total of 1563 kJ.

Moreover in the conventional example described above, there is the suggestion of storing high temperature oil after engine warm-up has been completed, however the sensible heat capacity of oil is relatively small, and there is a need to store a very large amount of oil in order to store the above amount of heat. For example, if the volume of oil required in order to supply 1563 kJ is calculated when employing oil at 100° C. (specific heat 2.13 kJ/K, density 0.852 kg/m$^3$), the total is extremely large, namely 1563/(2.13×50)/0.825=17 m$^3$, which is not practical. Implementation may be considered impossible when consideration is also given to heat exchange efficiency.

In consideration of the above circumstances, an object of the present invention is to enable a compact and high output heat storage system to perform warm-up rapidly when a vehicle is started up, and after warm-up, to recover surplus heat that is present in a heat source in the vehicle to prepare for the next warm-up event.

Solution to Problem

A heat recovery-type heating device according to a first aspect of the present invention includes: an ammonia buffer configured so as to be capable of fixing and desorbing ammonia that serves as a chemical reaction medium; a chemical heat storage reactor provided with a chemical heat storage material that generates heat through a chemical reaction with ammonia supplied from the ammonia buffer, and that desorbs ammonia using surplus heat from a heat source and returns the ammonia to the ammonia buffer.

In the heat recovery-type heating device according to the first aspect, the ammonia desorbed from the ammonia buffer is supplied to the chemical heat storage reactor, generating heat from the chemical reaction (a heat storage reaction due to coordinate bond) between the ammonia and the chemical heat storage material. Due to employing ammonia as the chemical reaction medium, ammonia can be desorbed from the ammonia buffer even under low temperature conditions, such as below freezing. Heating target components of a vehicle can accordingly be heated and rapidly warmed up by the heat generated by the chemical heat storage reactor.

Moreover after warm-up, a large amount of surplus heat from heat sources that is present inside the vehicle is employed to desorb the ammonia from the chemical heat storage material. A large amount of surplus heat that has hitherto not been usable can therefore be employed. The ammonia that has been desorbed from the chemical heat storage material is returned from the chemical heat storage reactor to the ammonia buffer and once again fixed thereto.

High reactivity and a high heat storage density can accordingly be obtained due to employing coordinated reaction heat between the chemical heat storage material and the ammonia, thereby enabling a more compact size and higher output system. Such a compact and high output heat storage system enables warm-up to be performed rapidly when a vehicle is started up, and enables surplus heat that is present in the vehicle to be recovered after warm-up to prepare for the next warm-up event.

A second aspect of the present invention is the heat recovery-type heating device of the first aspect, wherein a metal chloride is employed as the chemical heat storage material.

In the heat recovery-type heating device of the second aspect, stable repeated operation is made possible due to employing a metal chloride as the chemical heat storage material.

A third aspect of the present invention is the heat recovery-type heating device of the second aspect, wherein the metal chloride is at least one type of metal chloride selected from the group consisting of an alkaline metal chloride, an alkaline earth metal chloride, and a transition metal chloride.

In the heat recovery-type heating device of the third aspect, stable repeated operation is made possible due to employing at least one type of metal chloride selected from the group consisting of an alkaline metal chloride, an alkaline earth metal chloride, and a transition metal chloride as the chemical heat storage material.

A fourth aspect of the present invention is the heat recovery-type heating device of the third aspect, wherein: the alkaline metal chloride is LiCl; the alkaline earth metal chloride is at least one type of metal chloride selected from the group consisting of $MgCl_2$, $CaCl_2$, $SrCl_2$, and $BaCl_2$; and the transition metal chloride is at least one type of metal chloride selected from the group consisting of $MnCl_2$, $CoCl_2$, and NiCl.

In the heat recovery-type heating device according to the fourth aspect, stable repeated operation is made possible due to employing one or more of the above for the alkaline metal chloride, the alkaline earth metal chloride(s), and/or the transition metal chloride(s).

A fifth aspect of the present invention is the heat recovery-type heating device of any one of the first aspect to the fourth aspect, wherein an ammonia absorber vessel is employed as the ammonia buffer.

In the heat recovery-type heating device according to the fifth aspect, the ammonia vapor pressure upper limit can be controlled, and high reactivity can be secured, due to employing an ammonia absorber vessel as the ammonia buffer.

A sixth aspect of the present invention is the heat recovery-type heating device of the fifth aspect, wherein the ammonia absorber vessel is a flat plate layered type heat exchange type reactor.

In the heat recovery-type heating device according to the sixth aspect, heat transfer limitations can accordingly be kept to a minimum, and the rate of the absorption reactions and desorption reactions of the ammonia can be increased, due to configuring the ammonia absorber vessel with the flat plate layered type heat exchange type reactor. High heat output can accordingly be obtained from the chemical heat storage reactor.

A seventh aspect of the present invention is the heat recovery-type heating device of either the fifth aspect or the sixth aspect, wherein the inside of the ammonia absorber vessel is filled with an ammonia absorbing material.

In the heat recovery-type heating device according to the seventh aspect, ammonia fixing and desorption can be performed due to filling the inside of the ammonia absorber vessel with the ammonia absorbing material.

An eighth aspect of the present invention is the heat recovery-type heating device of the seventh aspect, wherein the ammonia absorbing material is a porous body with pores of 10 nm or less.

In the heat recovery-type heating device of the eighth aspect, ammonia fixing and desorption can be performed due to employing a porous body with pores as described above as the ammonia absorbing material.

A ninth aspect of the present invention is the heat recovery-type heating device of the seventh aspect, wherein the ammonia absorbing material is a physical absorbing material with a primary particle diameter of 50 μm or less.

In the heat recovery-type heating device according to the ninth aspect, ammonia fixing and desorption can be performed due to employing a physical absorbing material with a primary particle diameter as described above for the ammonia absorbing material.

In a tenth aspect of the present invention, the chemical heat storage reactor is provided to warm up heating target components.

In the heat recovery-type heating device according to the tenth aspect, the heating target components can be heated and warm-up performed rapidly using the heat generated by the chemical heat storage reactor.

In an eleventh aspect of the present invention, the heating target components are engine configuration components.

In the heat recovery-type heating device according to the eleventh aspect, the engine configuration components can be warmed up rapidly.

A twelfth aspect of the present invention is the heat recovery-type heating device of the eleventh aspect, wherein the engine configuration components are bearing portions for a crankshaft in an engine.

Under low temperature conditions for example in the region of 0° C., engine oil increases in viscosity, with an increase in friction in the pistons, crankshaft and valve train being a major cause of fuel efficiency loss.

In the heat recovery-type heating device according to the twelfth aspect, the chemical heat storage reactor is provided to the bearing portions for the crankshaft in the engine. When the engine is started up, the bearing portions can accordingly be warmed up rapidly, and the viscosity of oil on the bearing portions can be reduced, without employing an external heat supply. The warming efficiency per unit of heat can be improved by heating the bearing portions, that has a smaller heat capacity than the crankshaft. Moreover, the heat of the bearing portions after warm-up can be employed to desorb the ammonia from the chemical heat storage reactor and return the ammonia to the ammonia buffer.

A thirteenth aspect of the present invention is the heat recovery-type heating device of the tenth aspect, wherein the heating target components include a steam generator that steam heats a battery installed at a vehicle.

In the heat recovery-type heating device of the thirteenth aspect, the heating target components to which the chemical heat storage reactor is provided include the steam generator, enabling the heat generated by the coordinated reaction between the ammonia and the chemical heat storage material to be employed to generate steam. This steam condenses due to the temperature difference when it contacts a vehicle battery under extremely low temperature conditions, for example in the region of −30° C. When this occurs, the battery can be heated and warmed up by the latent heat of condensation. Thus employing the latent heat of the steam enables an improvement in heat transfer efficiency. Moreover, since the battery is heated by the steam rather than being directly heated by the chemical heat storage reactor, the condensation temperature of the steam is the upper heating limit. Excessive heating is accordingly suppressed, thereby enabling deterioration of the battery to be suppressed.

A fourteenth aspect of the present invention is the heat recovery-type heating device of the tenth aspect, wherein the heating target components include a second ammonia buffer that produces ammonia upon heating and supplies the ammonia to a diesel engine catalyst.

In the heat recovery-type heating device according to the fourteenth aspect, the heating target components to which the chemical heat storage reactor is provided include the second ammonia buffer that produces ammonia upon heating, thereby enabling the heat generated by the coordinated reaction between the ammonia and the chemical heat storage material in the chemical heat storage reactor to be employed to desorb the ammonia from the second ammonia buffer. This ammonia is supplied from a first ammonia supply device to the diesel engine catalyst, thereby enabling efficient purification of NOx in exhaust gas from engine start-up.

A fifteenth aspect of the present invention is the heat recovery-type heating device of the fourteenth aspect, wherein the second ammonia buffer is connected to a second chemical heat storage reactor that is an ammonia supply source with a larger capacity than the second ammonia buffer.

The amount of ammonia remaining in the second ammonia buffer is used up and decreases due to supplying ammonia to the catalyst. In the present heat recovery-type heating device, when the amount of remaining ammonia has decreased, supplementary ammonia can be supplied to the second ammonia buffer from the second chemical heat storage reactor that is an ammonia supply source with a larger capacity than the second ammonia buffer. Supply of ammonia to the catalyst when the engine is started up can accordingly be performed over a longer period.

Advantageous Effects of Invention

According to the heat recovery-type heating device of the first aspect configured as described above, the excellent advantageous effect is obtained whereby a compact and high output heat storage system enables warm-up to be performed rapidly when a vehicle is started up, and enables surplus heat that is present in heat sources inside the vehicle to be recovered after warm-up to prepare for the next warm-up event.

According to the heat recovery-type heating device of the second aspect, the excellent advantageous effect is obtained of enabling stable repeated operation.

According to the heat recovery-type heating device of the third aspect, the excellent advantageous effect is obtained of enabling stable repeated operation.

According to the heat recovery-type heating device of the fourth aspect, the excellent advantageous effect is obtained of enabling stable repeated operation.

According to the heat recovery-type heating device of the fifth aspect, the excellent advantageous effects are obtained of enabling an ammonia vapor pressure upper limit to be controlled, and of enabling high reactivity to be secured.

According to the heat recovery-type heating device of the sixth aspect, the excellent advantageous effect is obtained whereby high heat output can be obtained from the chemical heat storage reactor.

According to the heat recovery-type heating device of the seventh aspect, the excellent advantageous effect is obtained of enabling ammonia fixing and desorption to be performed by the ammonia absorbing material.

According to the heat recovery-type heating device of the eighth aspect, the excellent advantageous effect is obtained of enabling ammonia fixing and desorption to be performed employing a porous body that has pores as the ammonia absorbing material.

According to the heat recovery-type heating device of the ninth aspect, the excellent advantageous effect is obtained of enabling ammonia fixing and desorption to be performed employing a physical absorbing material with a primary particle diameter as described above as the ammonia absorbing material.

According to the heat recovery-type heating device of the tenth aspect, the excellent advantageous effect is obtained of enabling the heating target components to be heated and warm-up performed rapidly using the heat generated by the chemical heat storage reactor.

According to the heat recovery-type heating device of the eleventh aspect, the excellent advantageous effect is obtained of enabling the engine configuration components to be warmed up rapidly.

According to the heat recovery-type heating device of the twelfth aspect, the excellent advantageous effect is obtained of enabling bearing portions for a crankshaft to be warmed up rapidly when an engine is started up, and enabling the viscosity of oil on the bearing portions to be reduced.

According to the heat recovery-type heating device of the thirteenth aspect, the excellent advantageous effect is obtained of enabling a vehicle battery to be warmed up.

According to the heat recovery-type heating device of the fourteenth aspect, the excellent advantageous effect is obtained of enabling efficient purification of NOx in exhaust gas to be performed from when a diesel engine is started up.

According to the heat recovery-type heating device of the fifteenth aspect, the excellent advantageous effect is obtained whereby enabling the supply of ammonia to a catalyst when an engine is started up to be performed over a longer period.

BRIEF DESCRIPTION OF DRAWINGS

FIG. 1 to FIG. 3 relate to a first exemplary embodiment.

FIG. 4 to FIG. 8 relate to a second exemplary embodiment.

DESCRIPTION OF EMBODIMENTS

Explanation follows regarding exemplary embodiments of the present invention with reference to the drawings.

First Exemplary Embodiment

Figure 1:
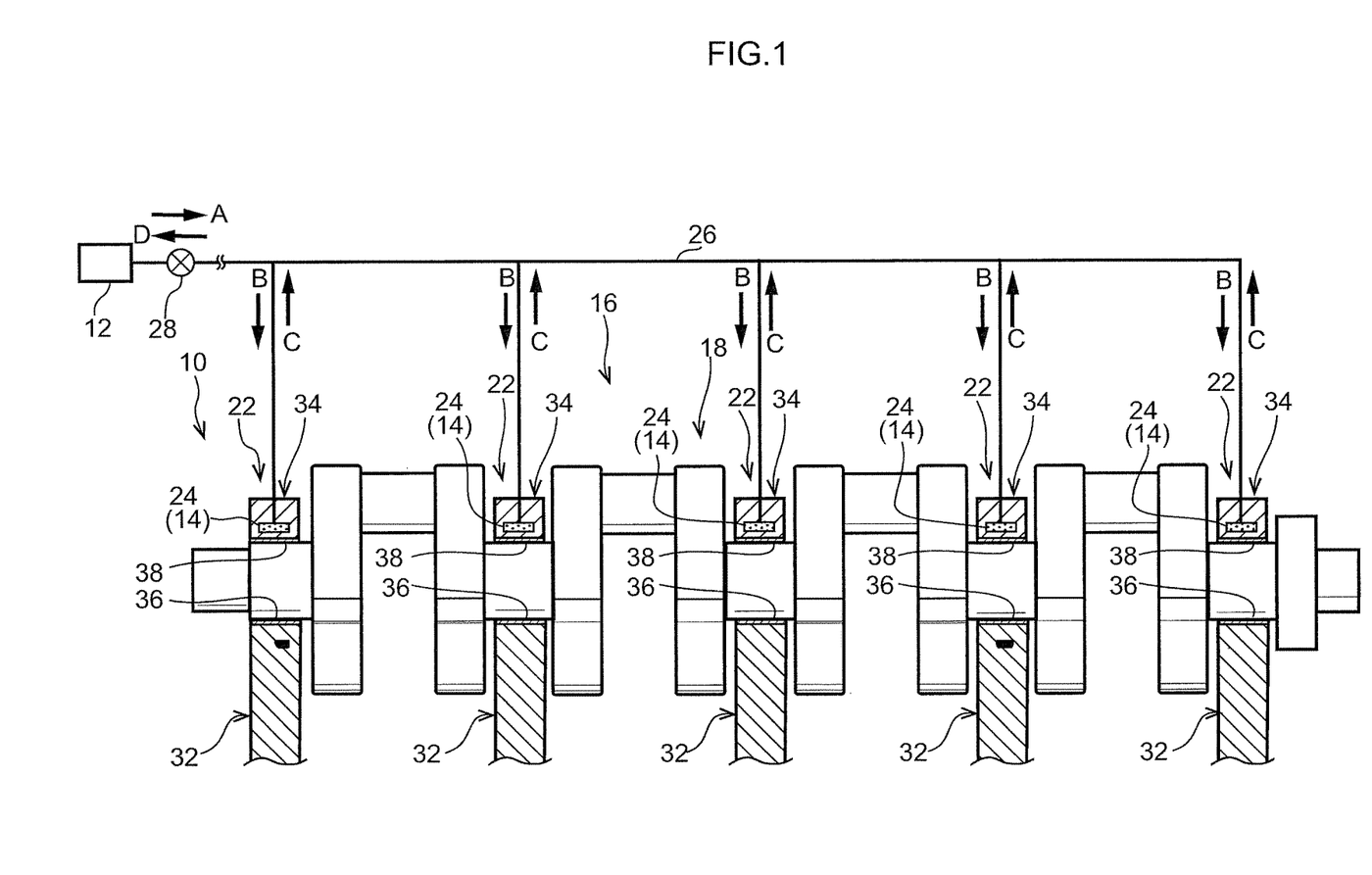
FIG. 1 is a schematic cross-section illustrating a heat recovery-type heating device for warming up bearing portions for a crankshaft in an engine.
Figure 2:
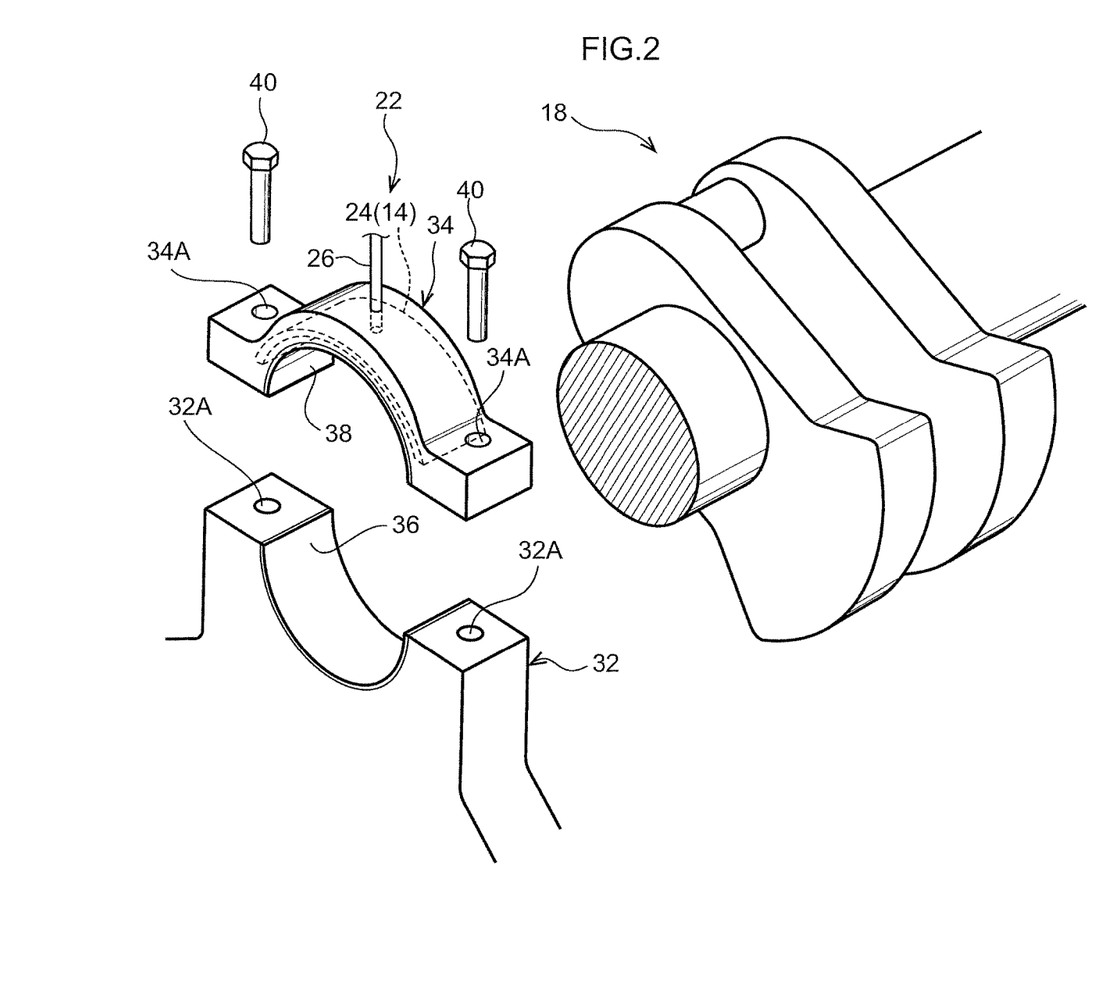
FIG. 2 is an enlarged perspective view illustrating a structure of bearing portions.

A heat recovery-type heating device 10 according to the present invention illustrated FIG. 1 and FIG. 2 includes an ammonia buffer 12 and chemical heat storage reactors 14. The chemical heat storage reactors 14 are provided on bearing portions 22 for a crankshaft 18 of a vehicle engine 16. The bearing portions 22 are an example of engine configuration components serving as heating target components of the vehicle.

The ammonia buffer 12 is for example an ammonia absorber vessel, and is configured to enable fixing and desorption of ammonia that serves as a catalyst in a chemical reaction. The ammonia buffer 12 is provided to the outside of the engine 16. The ammonia absorber vessel is for example a flat plate layered type heat exchange type reactor filled internally with multiple layers of ammonia absorbing material (not illustrated in the drawings). The ammonia absorbing material is for example a porous body with pores of 10 nm or smaller. The ammonia absorbing material has a primary particle diameter of for example 50 µm or less. The ammonia absorbing material preferably employs for example activated carbon, a zeolite, silica gel, or mesoporous silica.

A chemical heat storage material 24 is provided in the chemical heat storage reactors 14. The chemical heat storage material 24 generates heat through a chemical reaction with ammonia supplied from the ammonia buffer 12, and the ammonia is desorbed and returned to the ammonia buffer 12 by surplus heat from a heat source. The chemical heat storage reactors 14 are for example provided to plural of the bearing portions 22 and connected to the ammonia buffer 12 by a supply tube 26. The supply tube 26 is provided with a valve 28 that adjusts the amount of ammonia supplied from the ammonia buffer 12 to the chemical heat storage reactors 14.

As illustrated in FIG. 2, the bearing portions 22 are each configured with a two-part split structure including a base portion 32 that is integrally formed to an engine block side, and a clamping member 34 that is fixed to the base portion 32.

The base portion 32 and the clamping member 34 are respectively formed with semicircular cylinder shaped concave faces. Two-part split profile metal bearings 36, 38 are respectively provided to the base portion 32 and the clamping member 34 so as to follow the concave faces. The base portion 32 is for example formed with a pair of threaded holes 32A, and through holes 34A are formed to the clamping member 34 at positions corresponding to the threaded holes 32A. The crankshaft 18 is rotatably supported by the bearing portions 22 by passing bolts 40 through the through holes 34A and fastening the bolts 40 to the threaded holes 32A of the base portion 32.

The chemical heat storage reactors 14 are for example provided to the bearing portions 22 at positions in the vicinity of the concave faces of the clamping member 34. Specifically, the chemical heat storage reactors 14 are respectively configured by forming a curved shaped chamber to the clamping member 34 following the concave face, and filling this chamber with the chemical heat storage material 24.

The chemical heat storage material 24 employs for example a metal chloride. Such metal chlorides include for example at least one type out an alkaline metal chloride, an alkaline earth metal chloride, or a transition metal chloride. Specifically, an alkaline metal chloride is LiCl. Alkaline earth metal chlorides are at least one type out of $MgCl_2$, $CaCl_2$, $SrCl_2$, or $BaCl_2$. Transition metal chlorides are at least one type out of $MnCl_2$, $CoCl_2$, or $NiCl$.

When employing $CaCl_2$ as the chemical heat storage material 24, 2.4 kJ of heat can be output at 14 W per 1 cc. When the heat output required for each single bearing portion 22 is 50 W, each chamber configuring the chemical heat storage reactors 14 has a volume of about 5 cc, and the required volume of the ammonia absorber vessel configuring the ammonia buffer 12 is about 50 cc. Accordingly, including the chambers, the ammonia absorber vessel and the supply tube 26 there is a volume in the region of about 100 cc.

Operation

Explanation follows regarding operation of the present exemplary embodiment configured as described above. In for example low temperature conditions in the region of 0° C., engine oil increases in viscosity, with an increase in friction at pistons (not illustrated in the drawings), the crankshaft 18 and a valve train (not illustrated in the drawings) being a major cause of fuel efficiency loss.

As illustrated in FIG. 1, in the heat recovery-type heating device 10 of the present exemplary embodiment, the valve 28 provided to the supply tube 26 between the ammonia buffer 12 and the chemical heat storage reactors 14 is opened when the engine 16 of the vehicle is started up under the above conditions. The ammonia absorbing vessel configuring the ammonia buffer 12 is internally filled with the ammonia absorbing material, and the ammonia that is the chemical reaction catalyst can be desorbed from the ammonia absorbing material even at low temperatures in the region of 0° C. The ammonia passes through the supply tube 26 and is supplied to each of the chemical heat storage reactors 14 provided to the bearing portions 22 along the arrow A direction and the arrow B directions. Specifically, ammonia is supplied to the chemical heat storage reactors 14 at about 3 atmospheres (3039 hPa) at 0° C.

The chemical heat storage material 24 (the chemical heat storage reactors 14) rapidly produces heat due to the chemical reaction (a chemical heat storage reaction due to coordinate bond) between the ammonia and the chemical heat storage material 24 with which the chemical heat storage reactors 14 are filled. The bearing portions 22 are heated rapidly since the chemical heat storage reactors 14 are provided to the bearing portions 22 for the crankshaft 18 in the engine 16. Specifically, the temperature of the bearing portions 22 increases for example from 0° C. to in the region of 30° C. in 1 minute or less. The heat capacity of the bearing portions 22 is lower than the heat capacity of the crankshaft 18, at about $\frac{1}{10}$ thereof. The warming efficiency per unit of heat can accordingly be improved by heating the bearing portions 22.

In the present exemplary embodiment, when the engine 16 is started up the bearing portions 22 can accordingly be warmed up rapidly, and the viscosity of the oil of the bearing portions 22 can be reduced without employing an external heat supply. Friction between the crankshaft 18 and the bearing portions 22 can accordingly be reduced.

The supply rate of ammonia from the ammonia buffer 12 to the chemical heat storage reactors 14 can be controlled by the amount of ammonia retained in the system configured by the ammonia buffer 12, the chemical heat storage reactors 14 and the supply tube 26, and supply of the ammonia from the ammonia buffer 12 to the chemical heat storage reactors 14 can be stopped at an appropriate timing once the temperature of the bearing portions 22 has risen.

Explanation follows regarding operation after warm-up has been completed. After warm-up of the engine 16, the temperature of the bearing portions 22 is for example in the region of 70° C., such that there is a large amount of surplus heat. This surplus heat can be employed to desorb the ammonia from the chemical heat storage material 24.

Specifically, the valve 28 is opened when the temperature of the bearing portions 22 is in the region of 70° C. On opening the valve 28, the coordinate bonded ammonia is heated by the surplus heat of the bearing portions 22 and desorbs from the chemical heat storage material 24. As this is happening, a portion of the excess heat in the bearing portions 22 is recovered, and is stored as chemical energy.

The ammonia that has desorbed from the chemical heat storage material 24 returns to the ammonia buffer 12 through the supply tube 26 in the arrow C directions and the arrow D direction due to the pressure difference between the chemical heat storage reactors 14 and the ammonia buffer 12, and is once again fixed to the ammonia absorbing material of the ammonia absorber vessel configuring the ammonia buffer 12. By closing the valve 28 in this state, preparation can be made for the next warm-up event. Warm-up of the bearing portions 22 and heat recovery after warm-up can then be repeatedly performed again in a similar manner.

The present exemplary embodiment can accordingly obtain high reactivity and high heat storage density due to employing the heat of the coordinated reaction between the chemical heat storage material 24 and the ammonia. Specifically, efficient and rapid warm-up of the bearing portions 22 is made possible with a volume in the region of about 100 cc including the chambers of the chemical heat storage reactors 14, the ammonia absorber vessel of the ammonia buffer 12 and the supply tube 26. A reduction in system size and increase in system output are accordingly made possible.

Moreover, such a small size and high output heat storage system is capable of performing warm-up rapidly when the vehicle is started up, and is also capable of recovering surplus heat that is present in the vehicle after warm-up has been completed and preparing for the next warm-up event. A large amount of surplus heat that has hitherto not been usable can moreover be employed to desorb the ammonia from the chemical heat storage reactors 14.

Stable repeated operation is possible due to employing a metal chloride (at least one type out of an alkaline metal chloride, an alkaline earth metal chloride, or a transition metal chloride) for the chemical heat storage material 24.

Due to employing the ammonia absorber vessel as the ammonia buffer 12, an upper limit of the ammonia vapor pressure can be controlled, and high reactivity can be secured. Moreover, heat transfer limitations can be kept to a minimum, and the rate of the absorption reactions and desorption reactions of the ammonia can be increased due to configuring the ammonia absorber vessel with the flat plate layered type heat exchange type reactor. High heat output can accordingly be obtained from the chemical heat storage reactors 14.

Test Example

In order to verify the advantageous effects of the present invention, analysis of heat conduction and friction is performed for an Example according to the present exemplary embodiment, a Comparative Example 1 and a Comparative Example 2. Comparative Example 1 does not include a heating source for the bearing portions 22. In Comparative Example 2, 120 W electric heaters (not illustrated in the drawings) are inserted into the bearing portions 22, and the metal bearings 36, 38 are locally heated for 120 seconds, imparting 14.4 kJ of heat to the bearing portions 22.

Analysis conditions are as follows. $CaCl_2$ (chemical heat storage material 24) in the chambers of the chemical heat storage reactors 14 has a filling density of 0.7 g/cc, a heat output of 14 W/g, and a heat storage amount of 2.4 kJ/g. The ammonia absorber vessel has a volume of 5 cc (2 cc, 8 cc). Accordingly, when the volume of the ammonia absorber vessel is 5 cc, the heat storage amount of the $CaCl_2$ is 8.4 kJ. Note that the heat storage amount of $CaCl_2$ is 3.4 kJ when the volume of the ammonia absorber vessel is 2 cc, and is 13.4 kJ when the volume of the ammonia absorber vessel is 8 cc.

Figure 3:
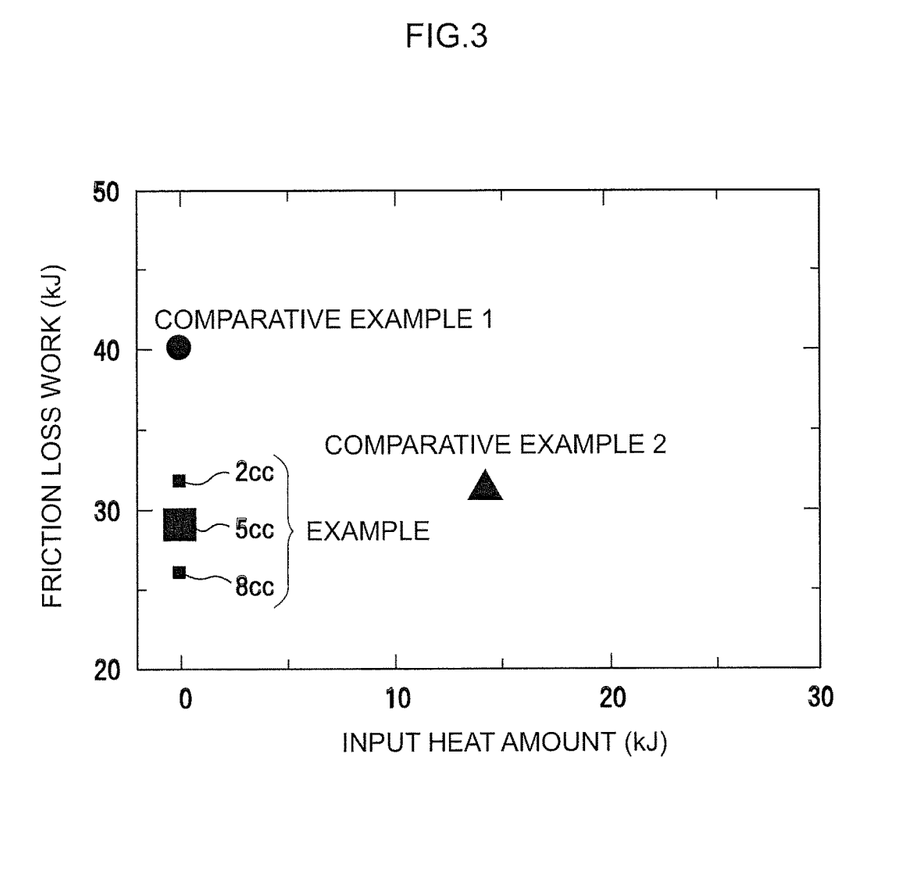
FIG. 3 is a graph illustrating analysis results of a Test Example.

Analysis results are as illustrated in FIG. 3. It can be verified that for each of the ammonia absorber vessel volumes of 2 cc, 5 cc, and 8 cc, without employing a external heat supply, the Example exhibits friction reducing effects similar to those of Comparative Example 2 or superior to those of Comparative Example 2, in which heating is performed by the electric heaters.

Second Exemplary Embodiment

Figure 4:
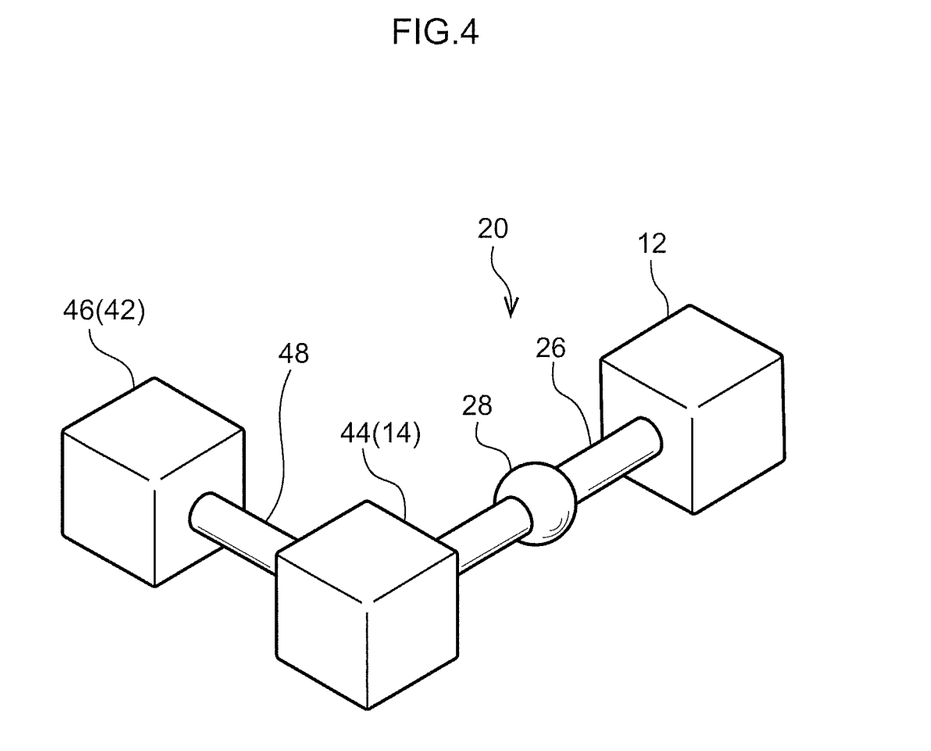
FIG. 4 is a schematic perspective view illustrating a heat recovery-type heating device and a battery.
Figure 5:
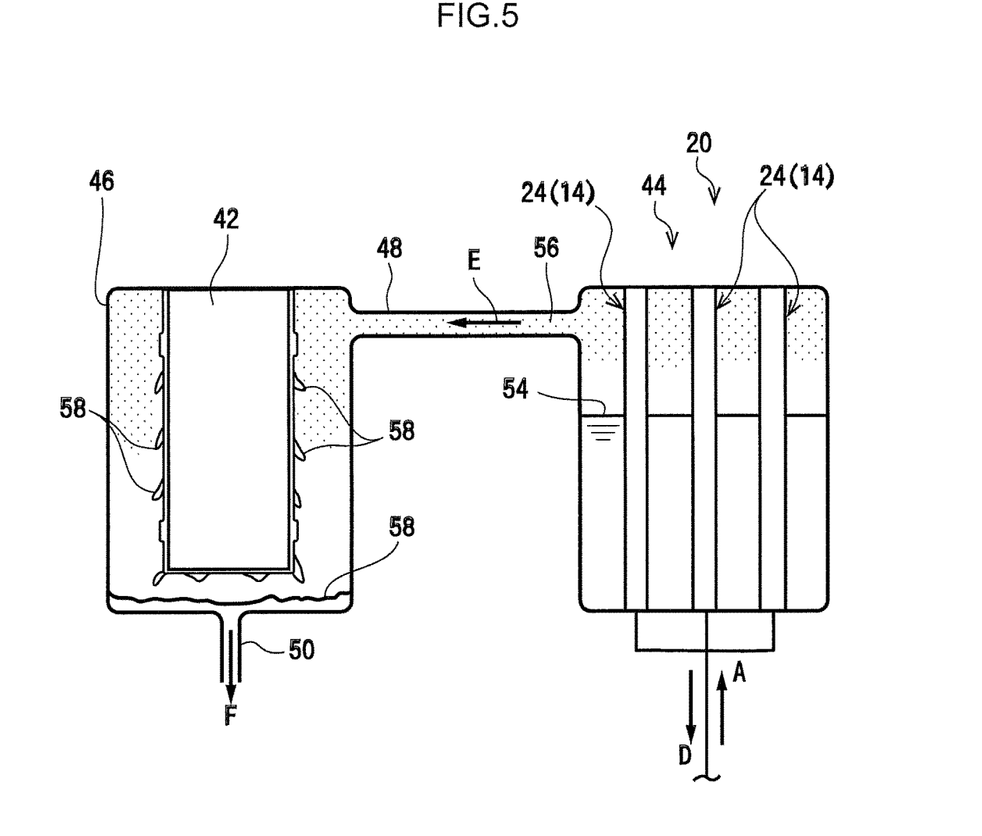
FIG. 5 is a schematic cross-section illustrating a steam generator and a battery.

In a heat recovery-type heating device 20 according to the present exemplary embodiment illustrated in FIG. 4 and FIG. 5, the chemical heat storage reactors 14 are provided to a steam generator 44 that steam heats a battery 42 that is installed at a vehicle. The battery 42 is an example of heating target components. The chemical heat storage reactors 14 and the steam generator 44 are for example configured with an integral structure and with a compact size. Water 54, serving as an example of a heating medium, is contained inside the steam generator 44, and the steam generator 44 and the ammonia buffer 12 are connected together by a supply tube 26. The valve 28 is provided to the supply tube 26 similarly to in the first exemplary embodiment.

The battery 42 is a battery that drives a vehicle installed in for example a hybrid vehicle (including plug-in types) or an electric vehicle. The battery 42 is for example provided inside a condenser 46. The condenser 46 and the steam generator 44 are connected together by a tube 48. A bottom portion of the condenser 46 is provided with a tube 50 that returns condensed water to the steam generator 44. Namely, the tube 50 is connected to the steam generator 44 (not illustrated in the drawings).

Note that the battery 42 and the condenser 46 may be configured superimposed with a layered formation. There is no limitation of the heating medium contained in the steam generator 44 to water.

Other portions are similar to those of the first exemplary embodiment. Similar portions are accordingly allocated the same reference numerals and explanation thereof is omitted.

Operation

Explanation follows regarding operation of the present exemplary embodiment configured as described above. When the battery 42 is only charged by a low percentage, it becomes difficult to obtain adequate performance from the battery 42 for example when in extremely low temperature states of −20° C. to −30° C.

In the heat recovery-type heating device 20 illustrated in FIG. 4 and FIG. 5, the valve 28 provided to the supply tube 26 between the ammonia buffer 12 and the chemical heat storage reactors 14 is opened when the hybrid vehicle or the electric vehicle is started up under the above conditions. The ammonia is thereby supplied from the ammonia buffer 12 to the chemical heat storage reactors 14 in the arrow A direction.

The chemical heat storage material 24 (the chemical heat storage reactors 14) rapidly produces heat due to the chemical reaction (a heat storage reaction due to coordinate bond) between the ammonia and the chemical heat storage material 24 with which the chemical heat storage reactors 14 are filled. $CaCl_2$ is employed as the chemical heat storage material 24, generating for example a heat output of 4 kW, and a heat generation amount of 600 kJ, enabling the temperature to be raised by 30K. Due to providing the chemical heat storage reactors 14 inside the steam generator 44, the heat evaporates the water 54, enabling generation of steam 56.

The steam 56 flows through the tube 48 towards the condenser 46 in the arrow E direction, and contacts the battery 42 that is under extremely low temperature conditions. When this occurs, the steam 56 is condensed due to the temperature difference between the steam 56 and the battery 42. As this occurs, the battery 42 can be warmed up by the latent heat of condensation without employing an external heat supply. Performance of the battery 42 under extremely low temperature conditions can accordingly be secured.

The heat transfer efficiency can be increased by thus employing latent heat of the steam 56. Moreover, since the battery 42 is heated by the steam 56 rather than being directly heated by the chemical heat storage reactors 14, the condensation temperature of the steam 56 (for example 60° C.) is the upper heating limit. Excessive heating is accordingly suppressed, thereby enabling deterioration of the battery 42 to be suppressed.

Water 58 generated by condensation is returned through the tube 50 to the steam generator 44 in the arrow F direction, and is reused in the steam 56 generation at the next warm-up event.

Explanation follows regarding operation after warm-up has been completed. After warm-up of the battery 42, the ammonia can be desorbed from the chemical heat storage material 24 using surplus heat generated by electrical system loss of for example the motor, a transaxle, a reactor, and an insulated gate bipolar transistor (IGBT), that are installed at the vehicle. When this occurs, a portion of the surplus heat is recovered, and is stored as chemical energy.

The ammonia that has been desorbed from the chemical heat storage material 24 returns through the supply tube 26 to the ammonia buffer 12 in the arrow D direction due to the pressure difference between the chemical heat storage reactors 14 and the ammonia buffer 12, and is once again fixed to the ammonia absorbing material of the ammonia absorber vessel configuring the ammonia buffer 12. By closing the valve 28 in this state, preparation can be made for the next warm-up event. Warm-up of the battery 42 and heat recovery after warm-up can then be repeatedly performed again in a similar manner.

Test Example

Figure 6:
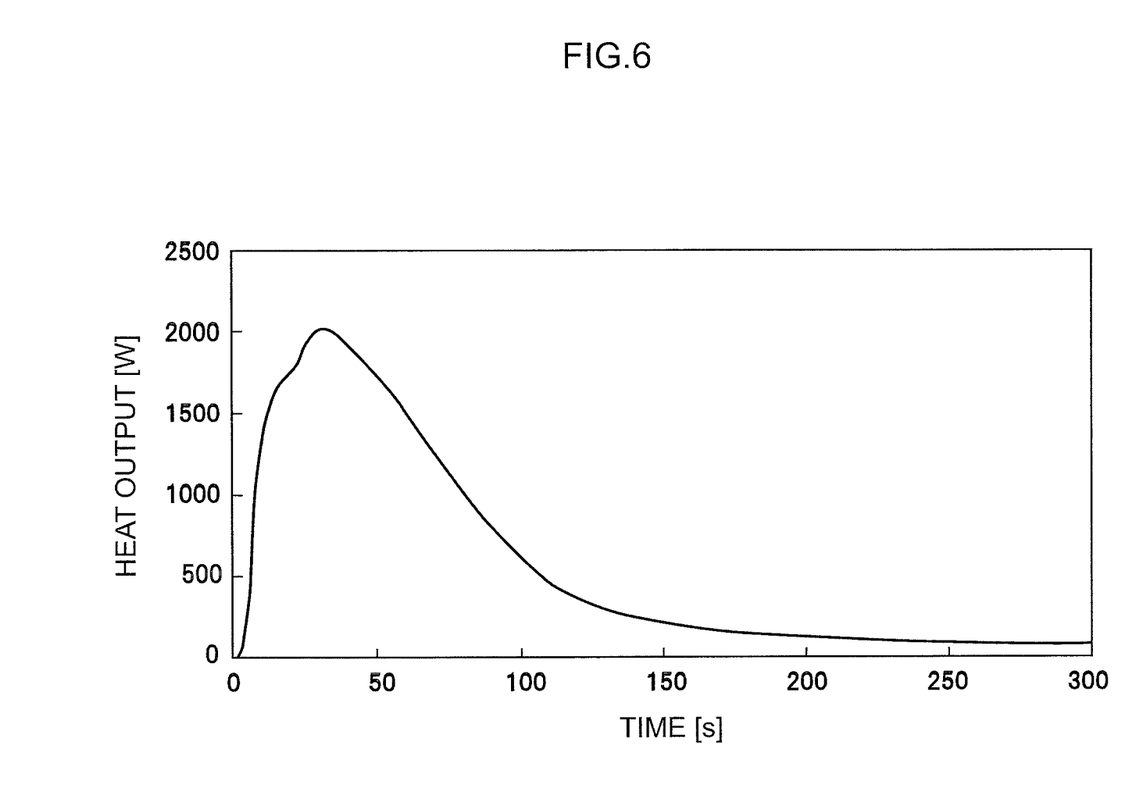
FIG. 6 is a line graph illustrating a relationship between time and heat output in a chemical heat storage reactor.

In order to verify the advantageous effects of the present exemplary embodiment, firstly a relationship between duration and heat output is derived for the chemical heat storage reactors for a case in which $CaCl_2$ is employed as the chemical heat storage material 24. Results are illustrated in FIG. 6. Heat output of about 2 kW can be obtained in the region of 30 seconds.

Figure 7:
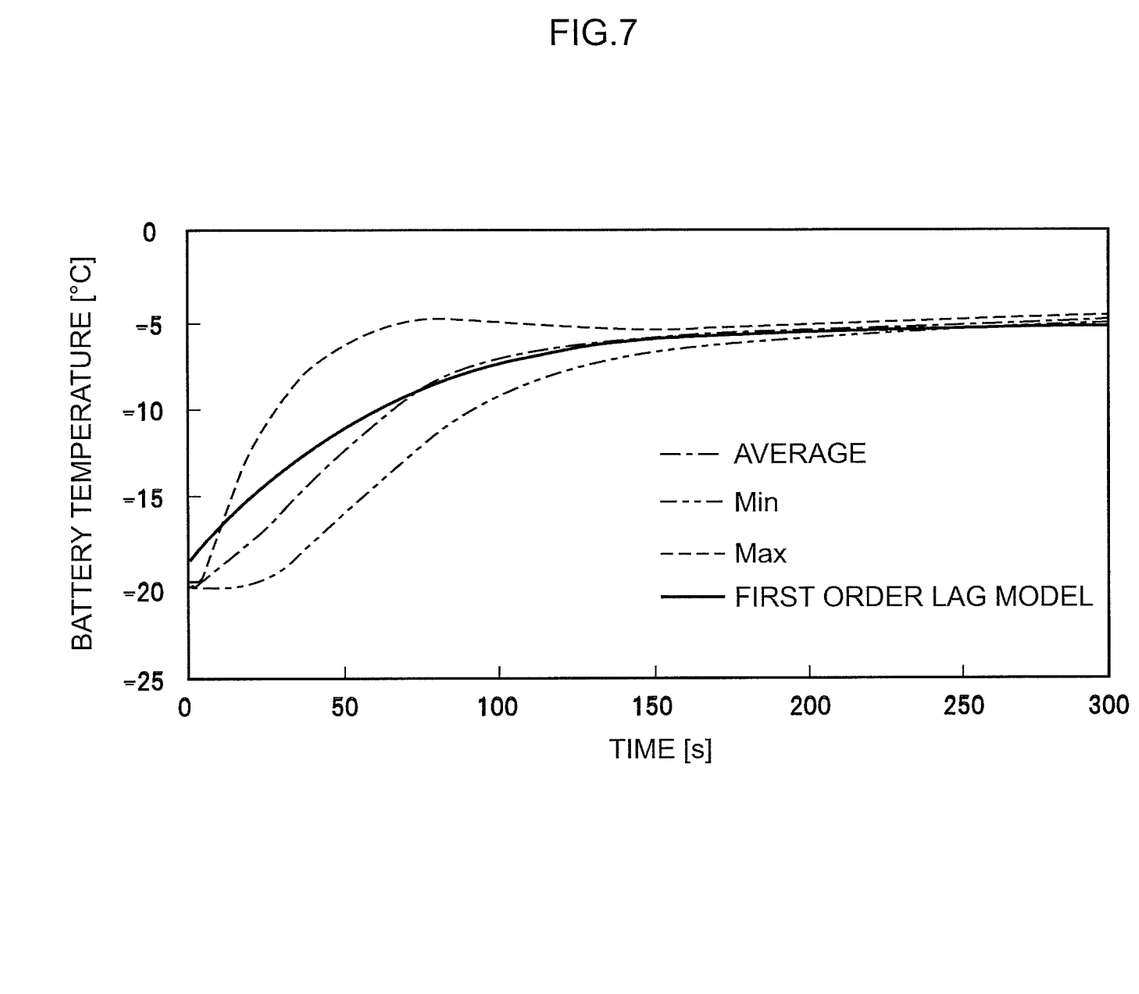
FIG. 7 is a line graph illustrating a relationship between heating time and battery temperature.

Next, temperature change is measured for each portion of a battery, when the chemical heat storage reactors are employed to steam heat the battery that is under conditions of about −20° C. In the drawings, "Min" indicates the temperature change at a central portion of the battery, and "Max" indicates the temperature change at the battery surface. "AVERAGE" is the average value of "Min" and "Max". "First order lag model" is a model of the "AVERAGE" as a first order lag element so as to match a vehicle installed state.

Figure 8:
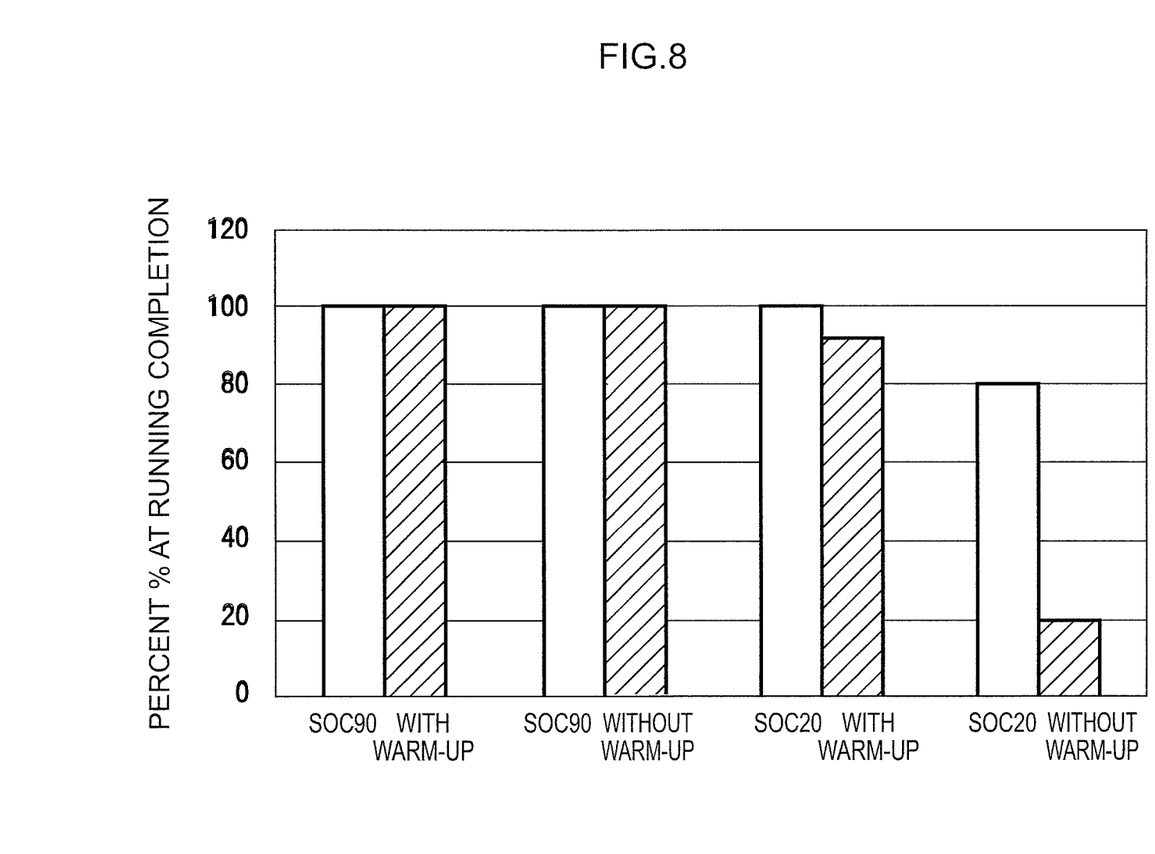
FIG. 8 is a graph illustrating a relationship between differences in charging rate and running completion rate for 2 types of battery.

Differences in running distance depending on the percentage charged and whether or not warm-up is performed are derived for the "first order lag model" temperature changes for 2 types of battery. Results are as shown in FIG. 8. In FIG. 8, the 2 types of columns differentiated by the presence or absence of hatching indicate the different types of battery. "SOC90" indicates a charge percentage of 90%. "SOC20" indicates a charge percentage of 20%.

According to FIG. 8, it can been seen that at a charge percentage of 90% both types of battery have a running completion rate of 100%, with a long running distance, regardless of whether or not warm-up is performed. At a charge percentage of 20%, the running completion rates for the 2 types of battery are respectively 80% and 20% when warm-up is not performed. However, the running completion rates for the 2 types of battery respectively rise to 100% and 90% when warm-up is performed. It can accordingly be verified that the battery warm-up of the present exemplary embodiment enables battery performance to be secured even under extremely low temperature conditions.

Third Exemplary Embodiment

Figure 9:
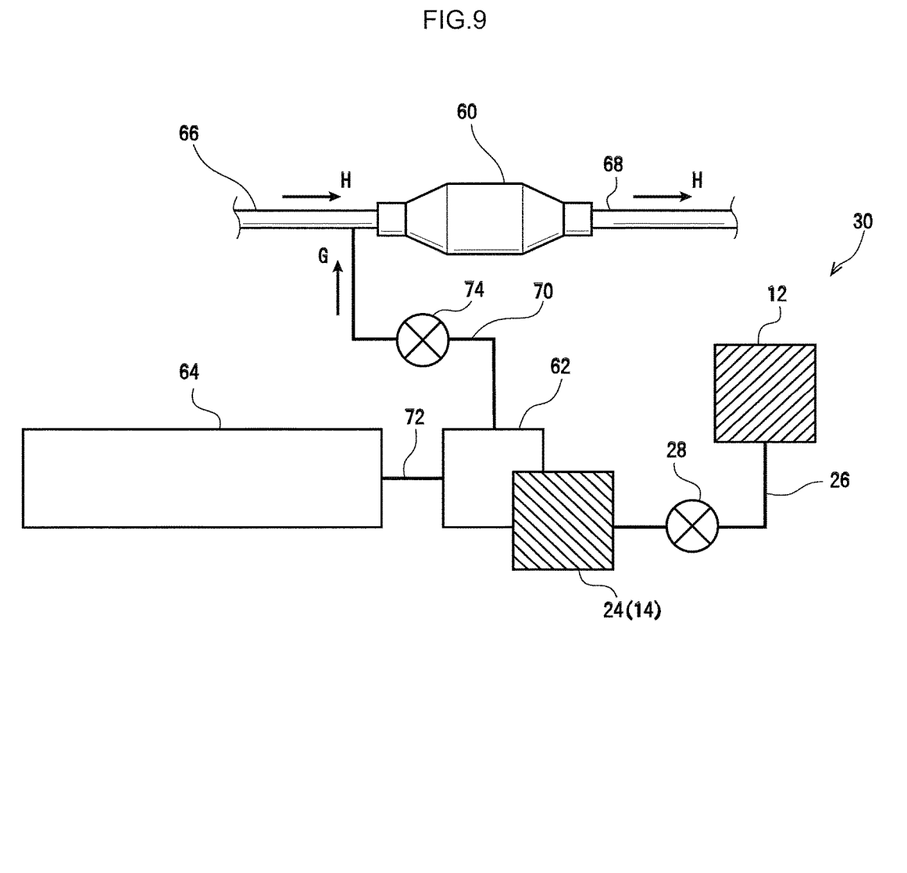
FIG. 9 is a block diagram of a heat recovery-type heating device, a second ammonia buffer, a second chemical heat storage reactor and a catalyst according to a third exemplary embodiment.

In a heat recovery-type heating device 30 according to the present exemplary embodiment illustrated in FIG. 9, the chemical heat storage reactors 14 are provided with a second ammonia buffer 62 that produces ammonia by heating and supplies the ammonia to a diesel engine catalyst 60. The second ammonia buffer 62 is an example of heating target components. The ammonia buffer 12 and the chemical heat storage reactors 14 are connected and closed off by the supply tube 26, and a material with deliquescence may be employed as the chemical heat storage material 24 that is capable of low temperature operation. Out of the metal chlorides mentioned in the first exemplary embodiment, $CaCl_2$ has particularly strong deliquescence, however such metal chlorides may also be employed as the chemical heat storage material 24.

The chemical heat storage reactors 14 and the second ammonia buffer 62 are for example configured with an integrated structure and with a compact size. The catalyst 60 is for example an ammonia selective catalytic reduction catalyst (SCR), and is serially connected between an upstream side exhaust pipe 66 and a downstream side exhaust pipe 68 as viewed from the diesel engine. The arrow H indicates the direction of exhaust gas flow.

The second ammonia buffer 62 is for example a heat exchange type reactor that is capable of releasing ammonia by heating. The second ammonia buffer 62 is filled with a chemical heat storage material (for example $BaCl_2$), not illustrated in the drawings. The second ammonia buffer 62 is connected to the upstream side exhaust pipe 66 by a tube 70 that supplies the ammonia to the catalyst 60. The tube 70 is provided with a valve 74.

The second ammonia buffer 62 is connected by a tube 72 to a second chemical heat storage reactor 64 that is an ammonia supply source with a greater capacity than the second ammonia buffer 62. The second chemical heat storage reactor 64 is filled with a chemical heat storage material (for example $MgCl_2$), not illustrated in the drawings. In comparison between the second ammonia buffer 62 and the second chemical heat storage reactor 64, the second ammonia buffer 62 has a lower capacity and a lower chemical heat storage material regeneration temperature.

Other portions are similar to those of the first exemplary embodiment. Similar portions are accordingly allocated the same reference numerals in the drawings and explanation thereof is omitted.

Operation

Explanation follows regarding operation of the present exemplary embodiment configured as described above. The diesel engine catalyst 60 is preferably started up at 100° C. to 150° C., and performance is difficult to achieve in extremely low temperature states of −20° C. to −30° C.

In the heat recovery-type heating device 30 of the present exemplary embodiment illustrated in FIG. 9, when the diesel engine is started up in such an environment, the valve 28 is opened and ammonia is supplied from the ammonia buffer 12 to the chemical heat storage reactors 14, and the chemical heat storage reactors 14 generate heat due to a coordinated reaction between the ammonia and the chemical heat storage material 24. The chemical heat storage reactors 14 generate for example a heat output of 4 kW and a heat generation amount of 600 kJ, raising the temperature by 30K. When the second ammonia buffer 62 is heated by this heat, ammonia absorbed inside the second ammonia buffer 62 desorbs.

Due to opening the valve 74, this ammonia flows through the tube 70 to the upstream side exhaust pipe 66 in the arrow G direction and is supplied to the catalyst 60 from the upstream side exhaust pipe 66. The catalyst 60 can accordingly perform efficient purification of NOx in exhaust gas rapidly after starting up the diesel engine even in a state of 100° C. to 150° C.

Note that an amount of heat is required in order to release ammonia from the second ammonia buffer 62 to the catalyst 60 that is in an atmospheric pressure location. In the present exemplary embodiment, configuration is made such that this amount of heat is supplied by the chemical heat storage reactors 14. The second ammonia buffer 62 is integrated together with the chemical heat storage reactors 14 and has a small heat capacity, such that it is possible to minimize the supply of heat from the chemical heat storage reactors 14 to the second ammonia buffer 62 according to the required ammonia supply amount to the catalyst 60.

Explanation follows regarding operation after warm-up has been completed. After warm-up, large heat sources with surplus heat are present, for example in the engine itself and in the exhaust pipes 66, 68. Ammonia can be desorbed from the chemical heat storage material 24 of the chemical heat storage reactors 14 whilst releasing ammonia from the second chemical heat storage reactor 64 by appropriately employing the surplus heat of these heat sources.

The ammonia desorbed from the chemical heat storage material 24 returns to the ammonia buffer 12 through the supply tube 26 due to the pressure difference between the chemical heat storage reactors 14 and the ammonia buffer 12, and is once again fixed to the ammonia absorbing material of the ammonia absorber vessel configuring the ammonia buffer 12. By closing the valve 28 in this state, preparation can be made for the next warm-up event. Heating of the second ammonia buffer 62 and way in-up of the catalyst 60, and heat recovery after warm-up, can then be repeatedly performed again in a similar manner.

The amount of ammonia remaining in the second ammonia buffer 62 is used up and decreases due to supplying the ammonia to the catalyst 60. In the present exemplary embodiment, after warm-up has been completed, the surplus heat can be employed to supply and supplement ammonia from the comparatively larger second chemical heat storage reactor 64 to the second ammonia buffer 62 in which the amount of ammonia remaining has decreased. Supply of ammonia to the catalyst 60 when the engine 16 is started up can accordingly be performed over a longer period.

Note that heat at about 200° C. is required in order to desorb ammonia from the chemical heat storage material ($MgCl_2$) of the second ammonia buffer 62. Exhaust heat, for example, can be employed as a heat source therefor.

Other Exemplary Embodiments

The heat recovery-type heating device 10, 20, 30 may be employed with heating target components other than the heating (warm-up) targets given in each of the exemplary embodiments described above, namely other than the bearing portions 22 of the crankshaft 18 (FIG. 1), the steam generator 44 (FIG. 5) and the second ammonia buffer 62 (FIG. 9) that serve as examples of heating target components. The heat recovery-type heating device 10, 20, 30 may also be employed to warm up engine configuration components other than the bearing portions 22 for the crankshaft 18.

An example has been given in which a metal chloride is employed as the chemical heat storage material 24, however the chemical heat storage material 24 is not limited thereto. Metal chlorides are moreover not limited to the examples given in the first exemplary embodiment.

The ammonia buffer 12 does not have to be an ammonia absorber vessel. When the ammonia buffer 12 is configured by an ammonia absorber vessel, the ammonia absorber vessel does not have to be a flat plate layered type heat exchange type reactor. An ammonia absorber vessel may moreover have an internal configuration that does not include an ammonia absorbing material. Ammonia absorbing materials are not limited to porous bodies with pores of 10 nm or less, and are not limited to a physical absorbing material with a primary particle diameter of 50 μm or less.

EXPLANATION OF THE REFERENCE NUMERALS

10 heat recovery-type heating device
12 ammonia buffer
14 chemical heat storage reactors
16 engine
18 crankshaft (heating target components, engine configuration components)
20 heat recovery-type heating device
22 bearing portions
24 chemical heat storage material
26 supply tube
28 valve
30 heat recovery-type heating device
42 battery
44 steam generator (heating target components)
56 steam
60 catalyst
62 second ammonia buffer (heating target components)
64 second chemical heat storage reactor

The invention claimed is:

1. A heat recovery-type heating device comprising:
an ammonia buffer configured so as to be capable of fixing and desorbing ammonia that serves as a chemical reaction medium;
a chemical heat storage reactor provided with a chemical heat storage material that generates heat through a chemical reaction with ammonia supplied from the ammonia buffer, and that desorbs ammonia using surplus heat from a heat source and returns the ammonia to the ammonia buffer, wherein:
the chemical heat storage reactor is provided to warm up heating target components; and
the heating target components include a second ammonia buffer that produces ammonia upon heating by heat generated by the chemical heat storage reactor and supplies the ammonia to a diesel engine catalyst.

2. The heat recovery-type heating device of claim 1, wherein a metal chloride is employed as the chemical heat storage material.

3. The heat recovery-type heating device of claim 2, wherein the metal chloride is at least one type of metal chloride selected from the group consisting of an alkaline metal chloride, an alkaline earth metal chloride, and a transition metal chloride.

4. The heat recovery-type heating device of claim 3, wherein:
the alkaline metal chloride is LiCl;
the alkaline earth metal chloride is at least one type of metal chloride selected from the group consisting of $MgCl_2$, $CaCl_2$, $SrCl_2$, and $BaCl_2$; and
the transition metal chloride is at least one type of metal chloride selected from the group consisting of $MnCl_2$, $CoCl_2$, and NiCl.

5. The heat recovery-type heating device of claim 1, wherein an ammonia absorber vessel is employed as the ammonia buffer.

6. The heat recovery-type heating device of claim 5, wherein the ammonia absorber vessel is a flat plate layered type heat exchange type reactor.

7. The heat recovery-type heating device of claim 5, wherein the inside of the ammonia absorber vessel is filled with an ammonia absorbing material.

8. The heat recovery-type heating device of claim 7, wherein the ammonia absorbing material is a porous body with pores of 10 nm or less.

9. The heat recovery-type heating device of claim 7, wherein the ammonia absorbing material is a physical absorbing material with a primary particle diameter of 50 μm or less.

10. The heat recovery-type heating device of claim 1, wherein the second ammonia buffer is connected to a second chemical heat storage reactor that is an ammonia supply source with a larger capacity than the second ammonia buffer.

11. The heat recovery-type heating device of claim 2, wherein an ammonia absorber vessel is employed as the ammonia buffer.

12. The heat recovery-type heating device of claim 3, wherein an ammonia absorber vessel is employed as the ammonia buffer.

13. The heat recovery-type heating device of claim 4, wherein an ammonia absorber vessel is employed as the ammonia buffer.

14. The heat recovery-type heating device of claim 6, wherein the inside of the ammonia absorber vessel is filled with an ammonia absorbing material.

* * * * *